United States Patent [19]
Hartmann et al.

[11] 3,931,134
[45] *Jan. 6, 1976

[54] PROCESS AND APPARATUS FOR THE SEPARATING OUT OF COARSE AND/OR HEAVY PARTICLES FROM A VARIABLE PARTICLE SIZE AND/OR VARIABLE PARTICLE WEIGHT MIXTURE OF GRANULAR SOLIDS MAINTAINED IN A VORTEX STATE

[75] Inventors: Rainer Hartmann, Frankfurt am Main; Oskar Dorschner, Bad Homburg; Hans-Werner Gross, Buchschlag, all of Germany

[73] Assignee: Veba-Chemie AG, Gelsenkirchen-Buer, Germany

[ * ] Notice: The portion of the term of this patent subsequent to Nov. 6, 1990, has been disclaimed.

[22] Filed: July 6, 1971

[21] Appl. No.: 160,186

Related U.S. Application Data

[62] Division of Ser. No. 792,682, Jan. 21, 1969, Pat. No. 3,627,129.

[30] Foreign Application Priority Data
Jan. 24, 1968   Germany............................ 1607648

[52] U.S. Cl.... 260/93.7; 260/94.9 D; 260/94.9 DA; 260/94.9 P
[51] Int. Cl.²...................... C08F 2/34; C08F 10/00

[58] Field of Search .. 260/94.9 P, 94.9 DA, 94.9 D, 260/93.7

[56]         References Cited
             UNITED STATES PATENTS
2,936,303   5/1960   Goins ........................... 260/94.9 P
3,023,203   2/1962   Dye............................... 260/94.9 D
3,627,129   12/1971  Hartmann et al.................. 209/502
3,770,714   11/1973  Dorschner et al.............. 260/94.9 P FOREIGN PATENTS OR APPLICATIONS
834,477   5/1960   United Kingdom............ 260/94.9 D Primary Examiner—Alan Holler
Attorney, Agent, or Firm—Burgess, Dinklage & Sprung

[57]         ABSTRACT

Elutriation apparatus and process using apparatus comprising an upper and a lower member separated by a restricted intermediate cross-section member wherein the lower member has a lesser cross section than the upper member. The process is carried out by operating the lower member as a dispersed suspension (known per se) elutriation apparatus and by operating the upper member as a dense fluidized bed (known per se) elutriation apparatus with the intermediate member causing an increase in the velocity, of at least 1.2 times, of the elutriant passing therethrough from the lower to the upper members.

8 Claims, 11 Drawing Figures

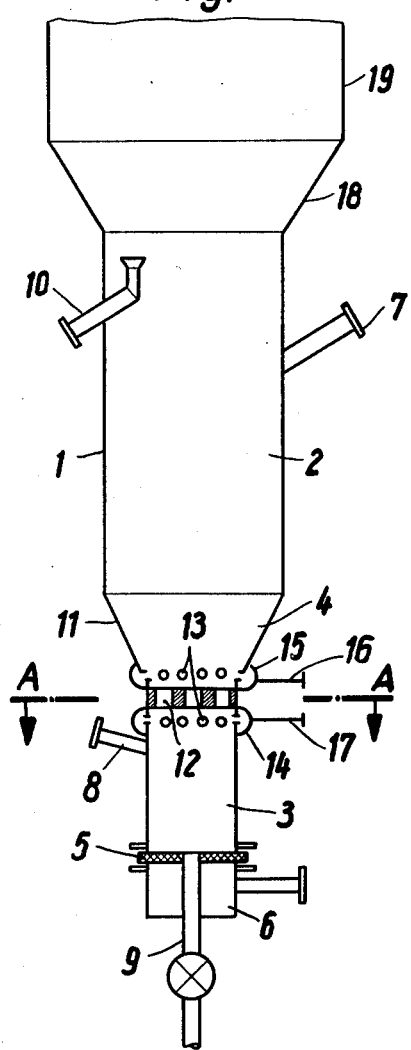
Fig.1
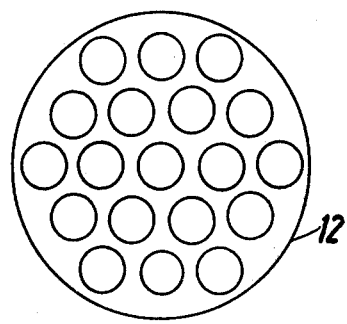
Fig.2 (A-A)
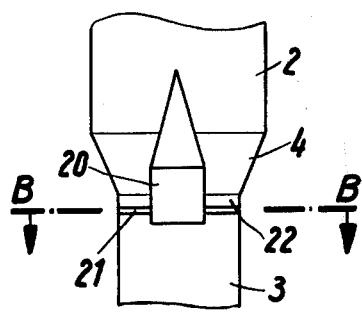
Fig.3
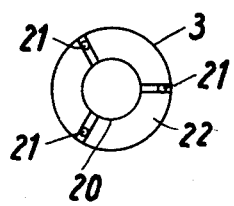
Fig.4 (B-B)

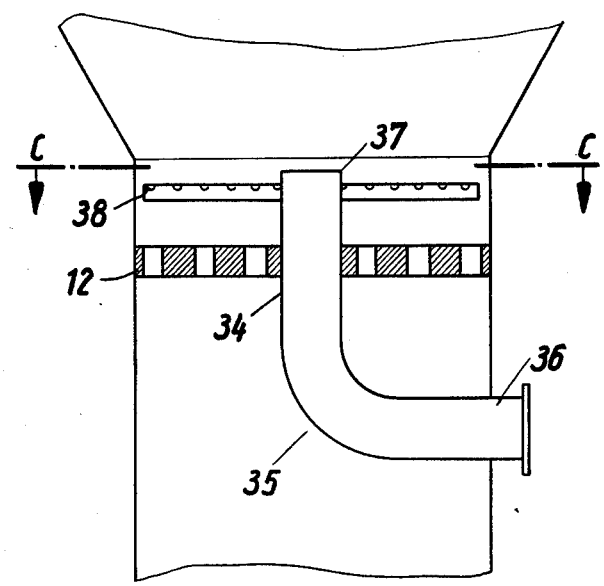
Fig. 7
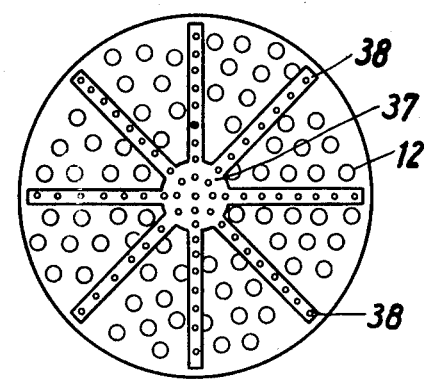
Fig. 8 (c-c)

PROCESS AND APPARATUS FOR THE SEPARATING OUT OF COARSE AND/OR HEAVY PARTICLES FROM A VARIABLE PARTICLE SIZE AND/OR VARIABLE PARTICLE WEIGHT MIXTURE OF GRANULAR SOLIDS MAINTAINED IN A VORTEX STATE

This application is a division of application Ser. No. 792,682, filed Jan. 21, 1969, now U.S. Pat. No. 3,627,129.

It is known that a separation of the constituents can be brought about in a granular mixture of solids that is composed of particles of variable size and weight and that is held in a fluidized state by means of a gas flow, said separation causing heavy or large-size particles to collect in the lower and lighter or smaller-size particles in the upper area.

Large-size and/or heavy particles, on the one hand, and small-size and/or light particles, on the other, are differentiated hereinafter as coarse and fine particles, respectively.

The upwardly flowing gas generating the fluidized condition in the mixture of solids is referred to hereinafter as carrier gas or elutrient.

It is known that mixture of solids of variable size or weight of the individual particles can be sorted out of the fluidized solids in that the finer particles are upwardly blown or flushed out of the fluidized solids by means of the carrier gas, with the coarser particles collecting for instance on the oncoming flow floor for the carrier gas, designed for instance as a grate, or where the coarser particles fall out of the spinning mixture, counter to the flow of the carrier gas, from a grateless, preferably conical zone.

In this manner it is possible to draw off the fine particles collecting at the surface of the spinning mixture of solids from a dense and only slightly agitated fluidized bed, and to remove the coarse particles depositing on the oncoming flow floor while the charge-mixture is being fed in at medium height of the bed.

Frequently, as a result of the formation of bubbles or tunnels in fluidized bed agitated more intensively by a carrier gas, a separation of the mixture of solids into its constituent elements fails to occur so that the aforementioned method is unsuccessful; this is the case in particular if the fluidized bed must be heavily agitated by the carrier gas to prevent, e.g., an agglutination of wet or glutinous particles.

Such a relatively dense bed can be compared with a boiling liquid since the carrier gas is apparently forming the dispersed phase — corresponding to steam bubbles in the liquid. Between the bubbles and tunnels, the mixture of solids forms coherent areas in which it is hardly possible for the individual particles to move with respect to one another.

Contrary to this system is the principle of the dispersed suspension: in this state, the individual particles can be considered as the dispersed phase in view of the fact that they are distributed in the carrier gas in a comparatively low concentration and can, therefore, move practically independently of one another.

In operations for the sorting out of coarser particles resulting from agglomeration, polymerization and the like, by means of grateless chambers, one uses, as a rule, a dispersed suspension.

The granular mixture is held in the grateless chamber in a strongly agitated and brokenup (aerated) condition. Through the adjusting of the amount of carrier gas to the amount of solids in the chamber it is possible to achieve an unstable state of the dispersed suspension in which solid particles fall out of the lower opening of the chamber. In the case of a particle mixture, the coarser particles whose speed of fall is greater than the velocity of the carrier gas are preferably discharged out of the chamber downwardly counter to the direction of flow of the gas. On the other hand, the finer particles contained in the mixture and whose speed of fall is smaller than the velocity of the carrier gas are carried along by the carrier gas and discharged upwardly out of the dispersed suspension.

The use of such devices for the particle separation of fine-grained solids, e.g., artificial fertilizer, and for the polymerization of gaseous or vaporous olefins with suitable catalysts is known in the art. The particular disadvantage in working with a free-flowing, spinning suspension of solids is that the carrier gas velocity required for maintaining the desired fluidized state is substantially above that of a fluidized bed of comparable diameter.

Moreover, in the case of these grateless vortex chambers known in the art, the amount of gas required to maintain the desired state of a vortex suspension increases with changes in the device dimensions to a greater extent than the square of the diameter of the most narrow cross-section, namely, as is known, by an exponential factor of about 2.5. Therefore, the enlarging of such equipment to sizes suitable for industrial applications is subject to rather narrow limitations.

To obviate this drawback, the carrier medium flow entering the chamber has been broken up by means of suitable installations into a plurality of currents of smaller cross-section, with the individual flow paths being designed for instance as Venturi tubes. However, even this design does not make it possible to achieve any substantially larger assemblies. Reactors exceeding a diameter of 50 cm in the most narrow reactor cross-sections are thus far unknown.

To this fact one must add that such reactors are rather critical with regard to their design. Once the geometric dimensions have been chosen, the aperture angle of the conical reactor jacket been determined, and the grain-size distribution of the mixture of solids to be separated has been preset, it is hardly possible to modify the reactor capacity in any way, and the elevation of the suspension zone can likewise not be substantially altered in view of the fact that the amount of gas required to cause the spinning of the particles present in the maximum reactor crosssection results in such an excessive speed with regard to the most narrow reactor cross-section that the coarse particles can no longer be made to drop out counter to the flow of the carrier medium.

Therefore, these reactors are sensitive also with respect to deviations from the preset grain-size distribution.

The object of the invention is a process and apparatus for the continuous separation of a coarse grain fraction, having a close grain-size distribution, out of a mixture of solids having variable grain sizes, maintained in a fluidized state by means of a carrier gas, whose grain-size distribution can be modified by agglomeration or polymerization.

It has now been found that it is possible to achieve a clear-cut separation of a narrow fraction of a given coarsest grain out of mixture of granular solids in a fluidized state, with any desired grain-size distribution, if one maintains in the upper section of a fluidized state chamber the state of a comparatively dense turbulent layer and, in the lower section, the state of a markedly aerated dispersed suspension, achievable through the selection of suitable cross-sections, and if one increases the velocity of the carrier gas at the border area between the two states through a reduction in cross-section in such a way that it comes into the range of incipient delivery, i.e., above the suspension velocity of the coarser particles.

This process is characterized in that the mixture of solids is maintained by the carrier gas in the upper area of the reactor at a greater reactor cross-section in a state of a dense fluidized bed and, in the lower area of the reactor at a smaller reactor cross-section in a state of a dispersed suspension and that in the boundary cross-section between these areas the velocity of flow of the carrier gas is increased, by means of a reduction in the cross-section, to more than 1.2 times the velocity of flow in the area of the dispersed suspension.

In view of the fact that the state of incipient delivery is unstable, coarse grains having a relatively broad grainsize distribution are discharged out of the upper turbulent layer into the dispersed suspension situated therebeneath. Within the dispersed suspension there occurs an intensive sorting of the grain fraction with the coarsest particles accumulating directly above the entrance floor for the carrier gas while the finer grain portions are carried into the upper turbulence layer by the carrier gas.

What was surprising was the fact that, as a result of the introduction of an intermediate border area with the ability to increase velocity, the combonation of a dense fluidized layer and a dispersed suspension layer in a single device was realizable at all, and that the required amount of carrier gas is practically independent of the elevation of the turbulent layer. This means that the conditions of the dense fluidized bed can be computed and adjusted in accordance with per se known methods and that such a reactor is operated in its upper section like a conventional fluidized bed reactor.

The great advantage of the discovered process consists, furthermore, in that the required velocity of the carrier gas for any desired suspension state is independent of the diameter of the selected fluidized bed and that, as a result, based on the instant invention, it is possible to operate reactors of any engineering dimensions.

A part of the carrier gas can be shunted off and discharged to the outside ahead of the reduced border area cross-section. This shunted off part of the carrier medium can be reintroduced in whole or in part above the narrowed boundary area cross-section into the dense fluidized bed in the upper reactor area; however, it can be returned also beneath the oncoming flow floor thereby achieving a cycle of the carrier medium across the area of the dispersed suspension. In addition to the carrier gas introduced from below into the reactor, a further amount of carrier gas can be introduced above the reduced boundary area cross-section.

By means of this simple arrangement it is possible to vary with respect to one another the velocity of flow in the fluidized bed, in the dispersed suspension and in the reduced boundary area cross-section.

As a result, a device of given dimensions can be readily adjusted to different particle size distribution charge mixtures.

Furthermore, it thus becomes possible to sort out a mixture of solids of mixed particle sizes, i.e., to separate it into several fractions of per se uniform grain sizes. This result can be achieved in such a way that the coarsest fraction contained in the mixed charge is separated out first and that, thereupon, the velocity of flow of the carrier gas in the individual or in more than two, e.g., three, zones is modified in such a way that the next grain fraction that has now become the coarsest one is separated out.

The possibility for an individual change in the velocity of flow of the carrier gas in a single, in two or in all three zones of the reactor is advantageous if the grainsize distribution of the mixed charge is being altered during its presence in the reactor, e.g., as a result of agglomeration, deposition of solids (e.g., coking) on the particles, or by means of polymerization. This is applicable, for example, with regard to the polymerization in the gaseous phase of olefins through contact with a catalyst-containing fine-grained polymer held in the fluidized state by means of an olefin-containing carrier gas (as set forth in one of the following Examples).

A reactor for the execution of the process according to the invention comprises two superpositioned preferably substantially coaxial cylindrical jackets, the upper one of which has a wider cross-section than the lower one. The cross-section ratio can be about 1:2 to 1:15, preferably 1:3 to 1:10, between the lower and the upper cross-sections, respectively.

The two cylindrical jackets can be interconnected at their adjoining extremities by means of an ordinary, annular disk. However, it is preferred to use a conical spacer as a connecting element in order to avoid producing blind angles in which solids are likely to deposit.

As is customary with this type of reactor, the carrier gas is introduced at the lower end of the lower cylinder via a floor suitable to receive the oncoming flow, a grate, or the like, and discharged at the upper end of the cylinder, possibly via a cyclone.

The granular mixture of solids to be sorted is being introduced laterally into the upper or lower cylinder. The coarse material accumulates on the oncoming flow floor or grate whence it is removed periodically or continuously in a per se known manner via a central peripheral or lateral removal means.

The fine grain material can, in a per se known manner, be discharged by the carrier gas current out of the upper cylinder and be separated out of the gas current in a cyclone, and/or be drawn off laterally from the level of the dense fluidized bed layer.

In the upper cross-section of the lower cylinder there is arranged, according to the invention, a cross-section reduction by means of which the velocity of flow of the carrier gas is increased so that maximum velocity of flow within the reactor prevails at this point.

Such a reduction in cross-section can be brought about for instance by means of a perforated plate, or by means of a concentrically inserted element, and should have an orifice total cross-section not exceeding 0.85 times the cross-section of the lower cylinder.

The aperture in the perforated plate are preferably dimensioned so that their individual diameters represent 5 to 20 times the size of the coarse grain particles to be separated out. In the case of the use of a concentric insert element, the annular clearance formed by it with respect to the reactor cross-section should have a width of 2 to 10 times the particle size of the coarse grain to be separated out. These values are preferred and may be adjusted upwardly or downwardly in given cases. The shape of the grain particles and the structure of the grain surface, on which the flow properties of a granular mixture depend to a large extent, have considerable influence on the dimensioning of said apertures.

The concentric insert element can be connected with the reactor by means of radial supports. Its shape may be conical or double truncated conical and it can be movably arranged on a vertical rod displaceable along the reactor axis.

Above and under the zone with the most narrow reactor cross-section, openings can be arranged in the reactor jacket, which lead to annular ducts. By means of these annular ducts, partial amounts of the carrier medium can be drawn off from and/or introduced into the reactor.

More specifically, a part of the carrier medium can be drawn off from the lower reactor zone through the lower annular duct ahead of the reduction in area and be reintroduced into the upper reactor zone above the reduction in area.

The accompanying drawing illustrates schematically and by way of example a reactor for the execution of the process according to the invention and individual components of said reactor.

FIG. 1 schematically shows an axial cross-section of a reactor;

FIG. 2 is a cross-section along line A—A of FIG. 1 and through the intermediate perforated plate narrowing down the flow cross-section;

FIG. 3 represents another embodiment of the reduction in cross-section between the two reactor zones by means of a concentric insert element shown as an axial section;

FIG. 4 represents a horizontal section through FIG. 3 along line B—B;

FIG. 7 shows another device for the introduction of additional carrier gas into the upper reaction zone, in a vertical cross-section;

FIG. 8 represents a horizontal section through FIG. 7 along line C—C;

Figure 6:
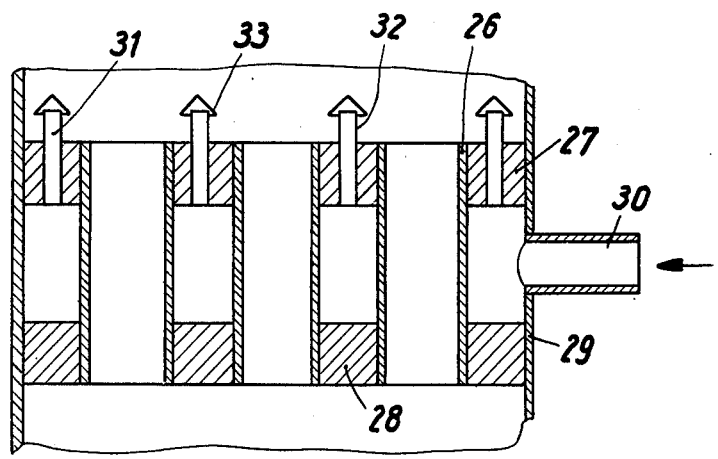
FIG. 6 illustrates a perforated plate according to FIGS. 1 and 2, with means for the additional introduction of carrier gas into the upper reactor zone.

The elutriation apparatus 1 schematically illustrated in FIG. 1 substantially comprises an upper chamber 2 having a larger cross-section, a lower chamber 3 having a smaller crosssection, a connecting intermediate zone 4 having a more narrow cross-section, a floor 5 suitable to receive feed flow of a carrier gas via an air chamber 6, and is provided with supply lines 7 and 8 for solid material to be processed, as well as with a discharge line 9 for coarse grain product that has been separated out, and an outlet 10 for fine grain product.

The connecting zone 4 is designed as a truncated cone 11. The reduction in area is by means of a perforated plate 12 illustrated enlarged as a horizontal cross-section in FIG. 2.

Beneath the perforated plate 12 in the jacket of the lower chamber and above the perforated plate 12 in the jacket of the connecting zone 4 there have been arranged openings 13 leading outside into annular ducts 14 and 15, respectively. The annular ducts are provided with pipe connections 16 and 17 by means of which the carrier gas can be drawn off or supplied.

In the manner customary with fluidized bed reactors, the upper chamber 2 can be joined via a truncated cone 18 to a stabilizer chamber 19 from which the carrier gas is drawn off through a separator by means of a line (not shown).

As illustrated in FIGS. 3 and 4, the perforated plate 12 can be replaced by an insert 20, concentrically arranged in the area of the contact point of the jackets of the lower chamber 3 and the connecting zone 4, which is fixedly connected to the elutriation apparatus jacket. The reduction in cross-section area is in this case accomplished by an annular clearance 22.

Figure 5:
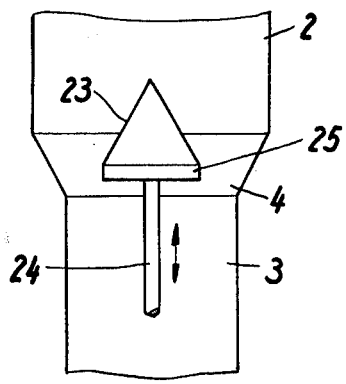
FIG. 5 illustrates a variant of the device according to FIG. 4, with adjustable intermediate area-reducing member.

As illustrated in FIG. 5, the concentrically arranged insert element 23 may have the shape of a cone and be fastened to a rod 24 displaceable along the apparatus axis. As a result of the vertical displacement of the element 23 in the area of the connecting zone 4, the cross-section area reduction 25 can be altered during operation. This principle may be applied also with regard to each individual bore of a perforated plate.

The system for the introduction of additional carrier gas into the upper chamber, consisting of an annular duct 15 with appropriate openings 13 and a pipe connection 16 (FIG. 1), can be replaced for instance by a special design of perforated plate 12 illustrated in FIG. 6.

In this case, the perforated plate consists of a plurality of pipes 26 held at their extremities in support elements 27 and 28. The support elements are connected with a cylindrical housing 29, which may also be the jacket of the lower chamber 3 (FIG. 1), and which is provided with a pipe connection 30 for the supply of carrier gas. In the upper support element 27, bores 31 have been arranged between the end points of the pipes 26, which lead to the hollow space between the pipes in the housing, thereby permitting the carrier gas supplied through a pipe connection 30 to issue through said bores. Pipes 32 provided with screen covers 33 are shown inserted in the bores 31.

FIGS. 7 and 8 illustrate another mode of realization for the supply of additional carrier gas to the upper reactor zone 2. Into a central bore in the perforated plate 12 there has been inserted a pipe 34 leading, via a bend 35, to a pipe connection 36 in the jacket of the lower chamber. The pipe 34 is provided at its upper end with a porous or perforated gas distribution plate 37. Furthermore, perforated distributor pipes 38 emanate radially from the upper pipe end, which can in per se known manner be provided with screen covers (not shown).

Additional carrier gas is introduced via the pipe connection 36 and enters into the upper chamber through the openings in the gas distributor pipe 37 and in the distributor pipes 38.

Figure 9:
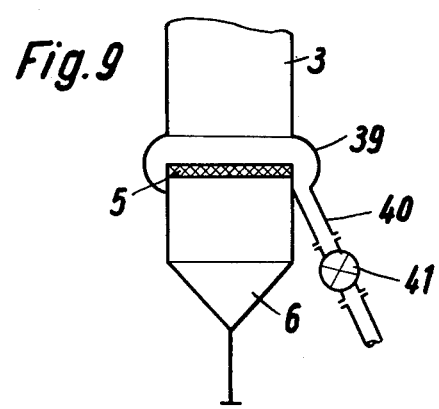
FIG. 9 shows a mode of realization of the coarse grain discharge above the floor suitable to receive the oncoming flow, represented as a vertical section.

FIG. 9 illustrates a variant of the coarse grain discharge means. Whereas in the apparatus according to FIG. 1 the sorted-out coarse grain accumulated on the floor 12 is being removed via a central outlet 9 traversing the air chamber 6 and by means of a bucket-wheel valve, the jacket of the lower chamber can, as shown in FIG. 9, be expanded at its lower extremity to form a bead-like annular space 39 constituting a cover over the floor 5 and the air chamber 6 and can be provided with a delivery pipe 40 comprising a bucket-wheel valve 41 for the removal of the coarse grain product.

Figure 10:
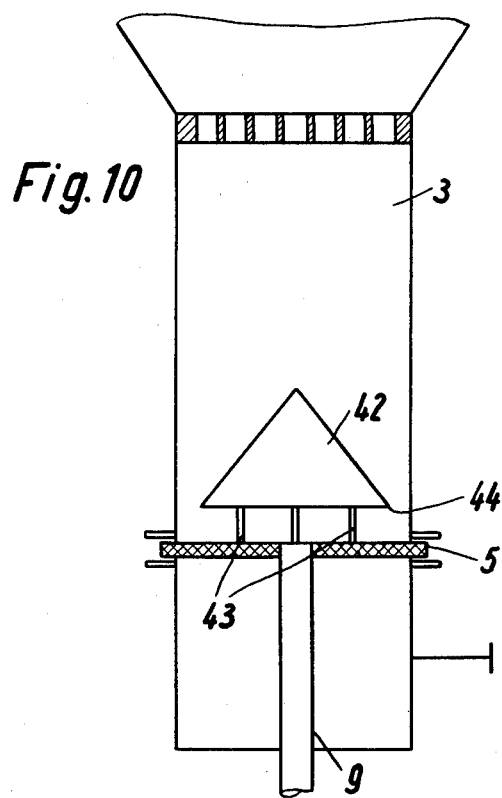
FIG. 10 represents, as an axial cross-section, a special design of the lower reactor zone.

FIG. 10 illustrates a particular design of the lower chamber 3, by means of which the selectivity with regard to the grain size to be sorted can be improved if need be. Spaced a short distance above the floor 5 for the feed flow, which comprises a central aperture for the coarse grain particle outlet 9, there is arranged a conical insert element 42 attached to the floor for instance by means of supports 43. The annular edge of this conical insert forms a narrowed passage 44 with the wall of the lower chamber. The carrier medium coming in through the oncoming flow floor flows first under the floor of the cone horizontally with respect to passage 44 at a velocity of flow somewhat greater than that of the velocity of the gas in the reactor zone, and generates in this area a final crosscurrent classification.

This arrangement is of significance in particular in the case of polymerization processes. For example, in olefin polymerization the carrier medium comprises a reactant in view of the fact that it contains the monomer.

The monomer can react with the catalyst still active in the polymer particles in the area of the lower reaction zone and thus use up the residual activity thereof while standardizing the grain size.

Figure 11:
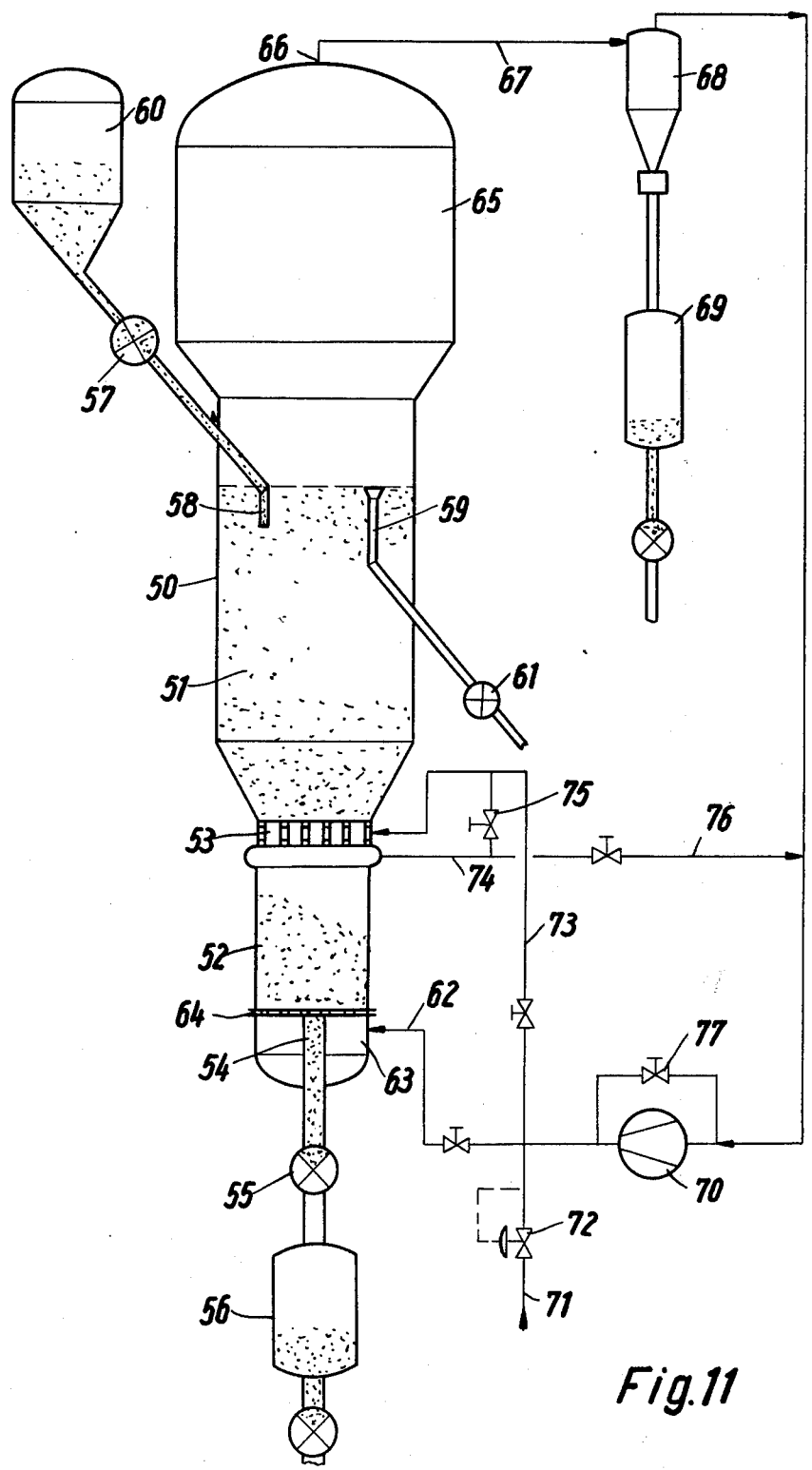
FIG. 11 is the flow diagram of a plant for the execution of the process according to the invention applied to the polymerization of gaseous monoolefins.

FIG. 11 illustrates the application of the process to the gaseous phase polymerization of ethylene. In an upper part 51 of a reactor 50, designed according to the invention, there is a dense turbulent fluidized layer formed by polymer and catalyst particles. In the course of the reaction there occurs a growth in the particles, owing to the growth of polymer on the catalyst nuclei, which results in an increase in the volume of the fluidized bed. In order to prevent a swelling of the bed, the large polymer particles containing only small amounts of still partially active catalyst must be flushed out of the process and, to this end, one uses the process according to the invention.

The coarse particles that have been produced are flushed out of the process by means of the pipe portions associated with the reduced area intermediate member designed according to FIG. 6 and a coarse grain particle discharge means 53 and enter a lower reactor part 52 where the state of an aerated dispersed suspension is formed and maintained. Here, the particles containing still partially active catalyst can permit full reaction before they enter the bin 56 by means of a discharge pipe 54 via a bucket-wheel valve 55.

To replenish the spent catalyst, a mixture comprising fine polymer and catalyst particles is continuously fed into the upper part of the vortex bed via a dosing device 57 and air input pipe 58 form a bin 60.

Fine particles can be drawn off at the surface of the turbulent layer via a discharge pipe 59 and a bucket-wheel valve 61, as initial preparation of the polymer particle and catalyst mixture. The carrier gas consisting, substantially, of the monomer to be polymerized enters a chamber 63 of the reactor via pipe connections 62 and flows sequentially via a gas distribution grid 64 through the lower part 52, the intermediate reduction in area member 53 and the vortex bed 51 of the reactor. In the enlarged top section of the reactor, particles that have been dragged along by the elutriant are separated out as a result of the reduction in the gas velocity. The carrier gas emerges from the reactor at 66, via line 67, and enters a cyclone 68 where the dust portion taken up by the carrier gas is separated out and falls into a dust accumulator 69.

Following cooling in gas coolers (not shown), the dustfree carrier gas is subsequently fed into a circular gas compressor 70 where it is compressed to the required pressure. The monomer consumed in the course of the reaction is replenished via a line 71 and a pressure-regulating valve 72. In accordance with process requirements it is possible, as described above, to feed a part of the current of the carrier gas, via a line 73, into the upper part of the reactor; a part of the gas current can be drawn off from the lower reactor part via line 74 and fed via a line 75 into the upper vortex bed, or completely or partially drained out of the reactor via a line 76. Control of the amount of carrier gas supplied to the reactor is achieved by means of a bypass valve 77 of the compressor. The olefin polymerization in accordance with the invention process can also be carried out at elevated pressures up to about 50 atm. gauge. In the case of propylene polymerization, for instance, preferred pressures may be around 15 atm. rxcess pressure.

The following Examples are illustrative of the practice of this invention without being limiting thereon.

EXAMPLE 1

For polymerization of ethylene in the gaseous phase, the plant was operated as illustrated in FIG. 11 and described above.

The upper cylindrical reactor part for accommodating the fluidized bed had a diameter of 200 mm and a height of 1.0 meter. The lower reactor zone had a diameter of 90 mm and a height of 15 cm. The two zones were connected by means of a 15 cm high conical junction element. The narrowing in the cross-section area at the boundary zone between the lower and the upper parts of the reactor, in accordance with the invention, was carried out in this case by means of a concentric rotor according to FIG. 3 and having an effective cylindrical diameter of 55 mm. The height of the cylindrical part was 50 cm while the overall height was 100 mm. The cone had been displaceably arranged in a manner similar to that shown in FIG. 5 and, in order to close the 40 mm diameter central discharge tube 9 (see FIG. 1), could be moved completely down. For the purpose of emptying the reactor completely, the cone could be slidably displaced up to a point in the upper reactor zone.

No use was made of the possibility of draining any carrier gas from the lower part of the reactor or of feeding additional amounts of carrier gas into the upper part.

The height of the fluidized bed in the upper reactor part varied between 400 and 800 mm. The grain-size of the material formed by catalyst and polymer particles was between 0.5 and 4.0 mm.

To maintain a well agitated fluidized state in the upper part of the reactor, 55 $m^3$ ethylene had to be fed into the reactor per hour.

The polymerization reaction was carried out at a slight overpressure of 1.2 atm. absolute pressure.

As a catalyst there was used a suitable Ziegler catalyst which was applied onto fine-grain polyethylene particles having an average grain size of approximately 0.5 mm. The catalyst represented 8 percent by weight of the catalyst-polymer mixture. To replenish the used up catalyst, upon working in continuous operation, 125 g/hour of catalyst-polymer mixture were fed into the reactor. 5 kg of polyethylene particles of a diameter between 2.0 and 3.5 mm were discharged per hour from the central discharge tube 9 via the bucket-wheel valve. In view of the fact that the polymerization is associated with particle growth, it was not necessary to flush fine material out of the reactor. The dust resulting from abrasion in the vortex bed was separated out in a cyclone; it amounted to approximately 10 g/hr.

The polymer particles discharged in the process exhibited the following grain spectrum:

| Particle size (mm) | Part by Weight (%) |
|---|---|
| up to 1.0 | 5.2 |
| 1.0 – 2.0 | 21.0 |
| 2.0 – 3.0 | 44.8 |
| 3.0 – 4.0 | 25.8 |
| above 4.0 | 3.2 |

EXAMPLE 2

For the purpose of separating out a fraction of coarse grain from an aggregate of polypropylene particles and for treating the particles simultaneously with air to deactivate the catalyst contained in the particles, a device was operated in accordance with FIG. 1, in which the annular ducts 14 and 15, as well as the gas inlet and outlet openings 13 had been omitted.

In this case, the ratio of the lower to the upper member diameters amounted to 0.4 with an upper reactor diameter of 500; the ratio of the narrowest cross-section member to the lower reactor cross-section was 0.45, the narrowest cross-section member having been formed by means of a perforated plate according to FIG. 2 and having openings of a total diameter of 22 mm.

The overall height of the reactor was 4.5 m; the height of the fluidized bed was varied between 1.0 and 1.5 m. The velocity of the carrier gas required to maintain a moderately agitated fluidized bed was 0.25 m/sec. Polypropylene granulate of the following composition was fed into the reactor at the rate of 44 kg/hr:

| Particle Size (mm) | Part by Weight (%) |
|---|---|
| up to 0.5 | 33.3 |
| 0.5 – 1.0 | 21.4 |
| 1.0 – 2.0 | 22.4 |
| 2.0 – 3.0 | 13.0 |
| 3.0 – 4.0 | 6.1 |
| 4.0 – 5.0 | 2.1 |
| above 5.0 | 1.3 |

There were removed via the central tube in the lower part of the reactor 15.0 kg/hr of coarse material having the following composition:

| Particle Size (mm) | Part by Weight (%) |
|---|---|
| up to 1.0 | 10.0 |
| 1.0 – 2.0 | 29.0 |
| 2.0 – 3.0 | 34.1 |
| 3.0 – 4.0 | 17.6 |
| 4.0 – 5.0 | 5.5 |
| above 5.0 | 3.8 |

The enriched fine material was drawn off from the surface of the fluidized bed by means of an overflow discharge tube 10.

EXAMPLE 3

To improve the selectivity of the process described in Example 2, a device according to FIG. 10 was mounted into the lower part of the reactor. The ratio of the diameter of the base of the cone to the diameter of the lower reactor part amounted to 0.69. The cone had an angle of 42° and was situated at a distance of 15 mm from the oncoming flow floor. The supplying of the charge material and the discharging of the coarse and fine material was carried out as in Example 2. The hourly yield was 13.5 kg of coarse material having the following composition:

| Particle Size (mm) | Part by Weight (%) |
|---|---|
| up to 1.0 | 2.1 |
| 1.0 – 2.0 | 27.2 |
| 2.0 – 3.0 | 39.6 |
| 3.0 – 4.0 | 20.0 |
| 4.0 – 5.0 | 6.9 |
| above 5.0 | 4.2 |

The composition of the fine material was practically unchanged.

EXAMPLE 4

A grain fraction having a greater proportion of coarse material than that referred to in Examples 2 and 3 was treated by performing the process, in the identical device used in such Examples. There was used as a reduction in area member a perforated plate designed according to FIG. 6 and having gas outlet bores 31 of a diameter of 2 mm each, without, however, tubes 32 and cover screens 33. In view of the fact that the velocity of the carrier gas required to maintain a moderately agitated fluidized state amounted to 0.3 m/sec with regard to the granulation of the material in question, another volume of gas representing approximately 20% of that entering the reactor via the floor receiving the oncoming flow was introduced additionally into the upper part of the reactor via the pipe connection 30 and the bores 31.

The charge material supply and volume were the same as in Example I. The discharging of the coarse and fine fractions was carried out as in Example 1. The charge product exhibited the following composition:

| Particle Size (mm) | Part by Weight (%) |
|---|---|
| up to 0.5 | 10.2 |
| 0.5 – 1.0 | 27.6 |
| 1.0 – 2.0 | 32.4 |
| 2.0 – 3.0 | 18.4 |
| 3.0 – 4.0 | 7.1 |
| 4.0 – 5.0 | 1.8 |
| 5.0 – 6.0 | 1.5 |
| above 6.0 | 1.0 |

21.0 kg of coarse material having the following composition were separated out per hour:

| Particle Size (mm) | Part by Weight (%) |
|---|---|
| up to 1.0 | 5.4 |
| 1.0 – 2.0 | 35.1 |
| 2.0 – 3.0 | 35.4 |
| 3.0 – 4.0 | 14.9 |
| 4.0 – 5.0 | 3.9 |
| 5.0 – 6.0 | 3.2 |
| above 6.0 | 2.1 |

What is claimed is:

1. Process of continuously recovering particulate material of coarser grain size from admixture with material of smaller grain size, which particulate material contains an olefin polymerization catalyst, which process comprises feeding a gaseous olefin through a first zone; establishing and maintaining a gas-solids suspension consisting of solid particulate material in said gaseous olefin in said first zone, said solid particulate material being reactable with said olefin so as to increase in grain size olefin undergoes polymerization; feeding said olefin from said first zone through an intermediate zone whose cross-section is a smaller cross-section up to about 0.85 that of said dispersed suspension first zone thereby increasing the velocity of said olefin relative to its velocity in said first zone; feeding said olefin from said intermediate zone to a second zone having a crossectional area about 2 to 15 times that of said first zone; establishing and maintaining a dense fluidized bed of said solid particulate material in said second zone; and recovering coarser grain solid particles from the base of said dispersed suspension first zone.

2. The process as claimed in claim 1 including providing said intermediate zone as a perforated plate and sizing the aperture of said perforations such that the diameters thereof are about 5 to 20 times the particle size of the coarser grain particles recovered from the base of said dispersed suspension first zone.

3. Process as claimed in claim 1 including providing said intermediate zone as an annulus between a jacket means and an insert element which annulus has a gap which is about 2 to 10 times the diameter of said coarser grain particles withdrawn from said dispersed suspension first zone.

4. Process as claimed in claim 1 including tapping a portion of said gas upstream of said intermediate zone.

5. Process as claimed in claim 4 including reintroducing said tapped gas to said process downstream of said intermediate zone.

6. Process as claimed in claim 5 including admixing said gas with fresh gas and feeding said admixture to said process downstream of said intermediate zone.

7. Process as claimed in claim 1 wherein the gas is under pressure.

8. Process as claimed in claim 5 including admixing said gas with fresh gas and feeding said admixture to said process upstream of said intermediate zone.

* * * * *